United States Patent
Bauchot

(10) Patent No.: US 11,157,748 B2
(45) Date of Patent: Oct. 26, 2021

(54) CROWD COUNTING

(71) Applicant: International Business Machines Corporation, Armonk, NY (US)

(72) Inventor: Frederic Bauchot, la Tourraque (FR)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 16/571,221

(22) Filed: Sep. 16, 2019

(65) Prior Publication Data
US 2021/0081679 A1   Mar. 18, 2021

(51) Int. Cl.
| G06K 9/00 | (2006.01) |
| H04W 4/02 | (2018.01) |
| H04W 4/80 | (2018.01) |
| G06T 7/215 | (2017.01) |
| G08B 13/196 | (2006.01) |

(52) U.S. Cl.
CPC ..... *G06K 9/00778* (2013.01); *G06K 9/00369* (2013.01); *G06T 7/215* (2017.01); *G08B 13/19673* (2013.01); *H04W 4/023* (2013.01); *H04W 4/80* (2018.02); *G06T 2207/30242* (2013.01)

(58) Field of Classification Search
CPC ......... G06K 9/00778; G06K 9/00369; H04W 4/023; H04W 4/80; G06T 7/215; G06T 2207/30242; G08B 13/19673
See application file for complete search history.

(56) References Cited

U.S. PATENT DOCUMENTS

| 8,711,737 B2 * | 4/2014 | Kandekar | H04W 4/023 370/270 |
| 8,768,867 B1 | 7/2014 | Thaeler | |
| 9,641,393 B2 | 5/2017 | Petersen | |
| 9,875,412 B2 | 1/2018 | Hotta | |

(Continued)

FOREIGN PATENT DOCUMENTS

EP   2704060 A3   11/2017

OTHER PUBLICATIONS

"Crowd counting", Wikipedia, The Free Encyclopdeia, This page was last edited on Nov. 14, 2018, <https://en.wikipedia.org/wiki/Crowd_counting>, 2 pages.

(Continued)

*Primary Examiner* — Christopher M Brandt
(74) *Attorney, Agent, or Firm* — Joseph P. Curcuru

(57) ABSTRACT

Embodiments of the present invention describe receiving, by a first device, an information vector over a short-range communication network established between the first device and a second device. Additionally, embodiments comprise determining the first identifier does not match the second identifier, merging one or more smart maps from the two or more computing devices together, comparing a first set of devices represented in the first set of participants and a second set of devices represented in the second set of participants, identifying pairs of matching devices in the first set of devices and the second set of devices, generating a set of unique devices by discarding one device for each pair of matching devices identified, and outputting a smart map comprising a count of participants equal to the sum of participants associated with the set of unique devices.

20 Claims, 6 Drawing Sheets

(56) References Cited

U.S. PATENT DOCUMENTS

| | | | | |
|---|---|---|---|---|
| 2009/0115617 A1* | 5/2009 | Sano | ............... | H04L 67/306 |
| | | | | 340/573.1 |
| 2015/0304815 A1* | 10/2015 | Ghose | ............... | H04W 4/023 |
| | | | | 455/456.3 |
| 2016/0110613 A1 | 4/2016 | Ghanem | | |
| 2017/0017846 A1 | 1/2017 | Felemban | | |
| 2017/0236096 A1* | 8/2017 | Tvaroh | ............... | G06F 3/0484 |
| | | | | 705/32 |
| 2017/0308812 A1 | 10/2017 | Kaisser | | |
| 2019/0104596 A1 | 4/2019 | Den Hartog | | |

OTHER PUBLICATIONS

Barber, Megan, "Crowd counting and cities: 5 things you need to know", Curbed, Updated, Jan. 19, 2018, <https://www.curbed.com/2017/1/24/14357842/crowd-counting-marches-inauguration-protest[5/23/19>, 20 pages.

* cited by examiner

CROWD COUNTING

BACKGROUND OF THE INVENTION

The present invention relates generally to the field of crowd counting, and more particularly to counting a class of people in a crowd.

Crowd counting or crowd estimating is a technique used to count or estimate the number of people in a crowd. The most direct method is to actually count each person in the crowd. For example, turnstiles are often used to precisely count the number of people entering an event. At events in streets or a park rather than an enclosed venue, crowd counting is more difficult and less precise.

SUMMARY

Embodiments of the present invention disclose a method, a computer program product, and a system for counting participants in a crowded environment comprising: receiving, by a first device, an information vector over a short-range communication network established between the first device and a second device, the first information vector sent by the second device, the first device having a first identifier representing a first group, the first device associated with a first set of participants having a first count, the second device having a second identifier representing a second group, the second device associated with a second set of participants having a second count; determining the first identifier does not match the second identifier; merging one or more smart maps from the two or more computing devices together; comparing a first set of devices represented in the first set of participants and a second set of devices represented in the second set of participants; identifying pairs of matching devices in the first set of devices and the second set of devices; generating a set of unique devices by discarding one device for each pair of matching devices identified; and outputting a smart map comprising a count of participants equal to the sum of participants associated with the set of unique devices.

DETAILED DESCRIPTION

Figure 1:
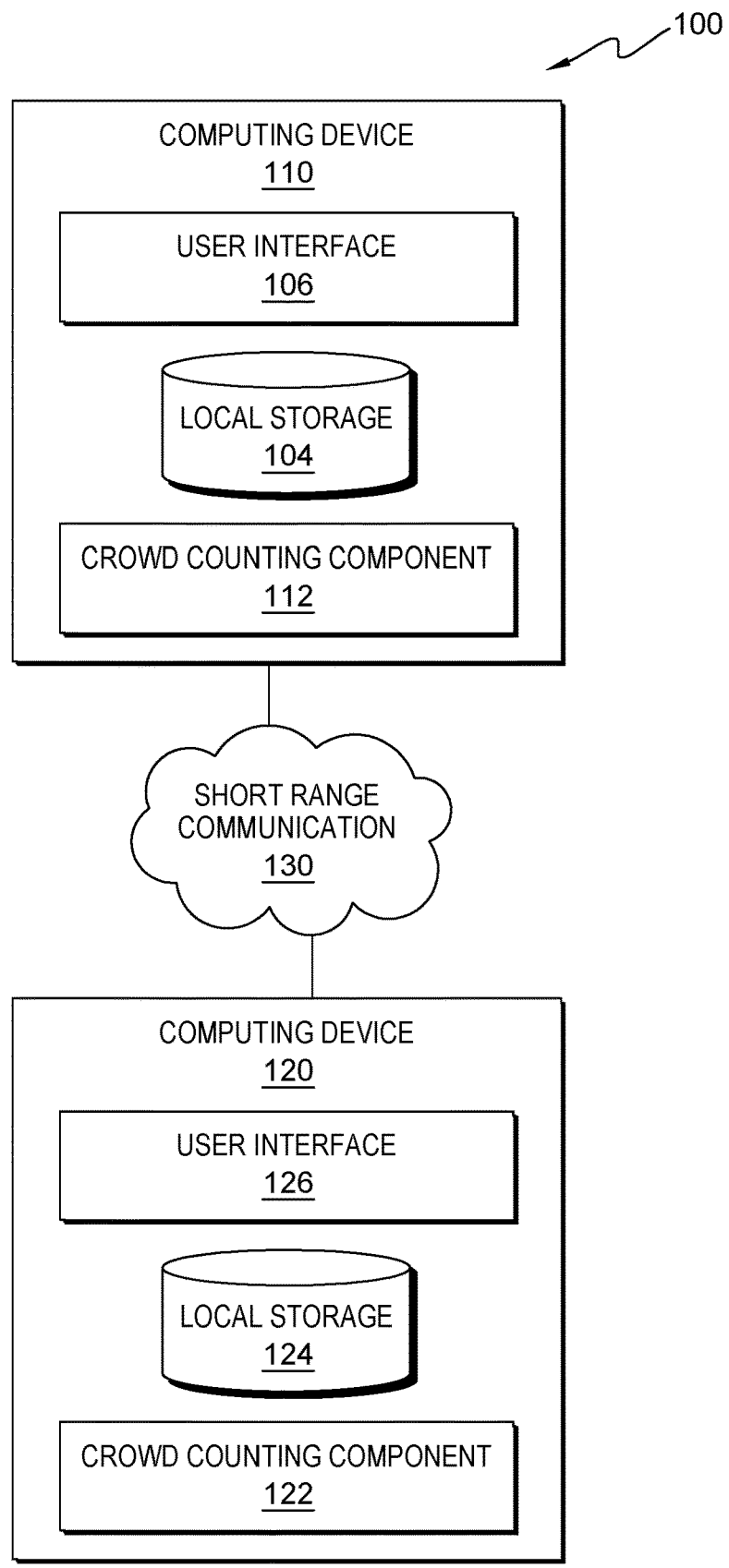
FIG. 1 is a functional block diagram illustrating a distributed data processing environment, in accordance with an embodiment of the present invention.

Oftentimes the number of people in a crowd according to event organizers is different than the number counted by third parties. Several solutions have been proposed for crowd counting (CC) evaluation such as evaluations based on image/video analysis, modelization techniques, or asking participants of an event to register to a CC application. Conventional solutions fail to distinguish people at a location from participants of a particular event at a location.

The solutions proposed by embodiments of the present invention are based on an approach that utilizes short-range communication to obtain the count of participants attending an event. Some embodiments of the present invention leverage short-range communication and computing capabilities of the computing devices carried by the participants such as smart phones, smart watches, tablets, and the like. Short-range communication and processing capabilities featured by computing devices enable collaborative evaluation of the size of a crowd of participants at an event.

Some embodiments of the present invention distinguish people at a particular location from participants of an event at the location. Participants of an event are usually a subset of the people present at the location of the event. Some people who are merely present at the event are not actively participating in the event. For purposes of this Detailed Description the term "participants" refers to participants of an event and the term "people" and "persons" refers to all people generally at the location of the event whether participating in the event or not. Participants are uniquely identified as people within a crowd who have enabled short-range communications on their computing devices for the purpose of being counted among a crowd and participating in sub-groups of the crowd.

Various embodiments of the present invention do not require communication infrastructure (e.g., no need for coverage by Global System for Mobile Communications (GSM) or any other communication infrastructure known in the art). For example, some embodiments of the present invention operate without any fixed infrastructure such as telecommunication networks (e.g. GSM or public wireless local area networking (WLAN)), communicating tags, for any image or video recording means, and/or any centralized IT infrastructure. Some embodiments of the present invention are based on peer-to-peer short-range communications (e.g. with Bluetooth, ZigBee, infrared transmission, dedicated short-range communication (DSRC), etc.) and on distributed computing realized by the computing devices carried by people attending an event. Furthermore, various embodiments of the present invention produce a count of only the people at a location that are participating in the event. (Note: the term(s) "BLUETOOTH" and/or "ZIGBEE" may be subject to trademark rights in various jurisdictions throughout the world and are used here only in reference to the products or services properly denominated by the marks to the extent that such trademark rights may exist.)

Embodiments of the present invention can utilize the concept of a group. A group is a set of participants who are within range of one another to enable short-range communication capabilities of their computing devices. Some embodiments of the present invention operate as a crowd counting application stored on computing devices carried by participants. Embodiments of the present invention can process the information carried signals over the short-range communication. In various embodiments of the present invention, if two groups come within communication range of one another, then the two groups can merge to form a single, larger group according to some shared programmatic logic. Embodiments of the present invention can record a list of group members and compute the number of group members on the list. Huge crowds of several tens of thousands of participants, could lead to unmanageable constraints in terms of storage and computing capabilities for the computing devices of the participants.

To alleviate the constraints, some embodiments of the present invention provide for the crowd counting application to record (i) a short list of the participants having recently joined a group (i.e., short term list/split of group members), and (ii) the number of participants having formerly joined the group (i.e., long term list/split of group members). Some programmatic logic detailed hereafter enables embodiments of the present invention to collaboratively manage the "short term/long term" split of group members, in particular when two groups are merging. In embodiments of the present invention, when one or more of the participants in a crowd gather around a target crowd meeting point, some individual groups can merge, resulting into a unique group size corresponding to the actual crowd count. In embodiments of the present invention, enabled computing devices carried by participants form the infrastructure of the proposed solutions, detailed above. As stated above, some embodiments of the present invention provide for participants to be counted while people not participating in the event are not included. Some embodiments of the present invention take advantage of the groups concept by taking advantage of natural grouping tendencies or planned grouping of participants apart from other people at the location who are not participating. The count for each established group is the basis of a total count of participants in a crowd, the crowd being made up of groups of participants.

In some embodiments of the present invention, participants carry computing devices, typically smart phones, that have short-range communication capabilities. It is known in the art for computing devices to have short-range communication capabilities (e.g. Bluetooth, Infrared (IR), etc . . . ). The programmatic logic of the solution provided by embodiments of the present invention can typically be implemented as a mobile application running on one or more computing devices, leveraging its communication and processing capabilities. In some embodiments of the present invention, there is no infrastructure required for the one or more computing devices to communicate. For example, computing devices use short-range communication to connect and communication with other computing devices enabled and close enough to connect, in which the computing devices that connect to each other, via short-range communication build a network between one-another based on the short-range communication connection. In this example, the connections between the computing devices, via short-range communication, can build on each connection forming a network without infrastructure.

In various embodiments of the present invention, a crowd of people receives a unique identifier or unique crowd identifier. Crowds are made up of members/participants. In various embodiments of the present invention, the groups of participants forming the crowd can be assigned and/or identified by a unique Group Identifier (Gid). Each group within the crowd is based on the corresponding computing devices being assigned a unique Gid. In various embodiments of the present invention, a computing device can receive or be assigned a unique Own Group Identifier (OGid), in which the OGid corresponds to a default group pertaining to a person or set of associated people in possession of the computing device. In various embodiments of the present invention, a computing device can transmit a signal to nearby enabled computing devices on a periodic basis and receive signals from nearby enabled computing devices on a periodic basis. In various embodiments of the present invention, such signals are called information vectors. In various embodiments of the present invention, a computing device associated with one group can be assigned to another group within the crowd, according to the programmatic logic described below.

It should be noted herein that in the described embodiments, participating parties have consented to participating and being monitored/tracked, and participating parties are aware of the potential that such tracking and monitoring may be taking place. In various embodiments, for example, when downloading or operating an embodiment of the present invention, the embodiment of the invention presents a terms and conditions prompt enabling the user to opt-in or opt-out of participation. Similarly, in various embodiments, emails and texts used to assemble the groups and/or distribute the identifiers within the crowd begin with a written notification that information about the user may be tracked, recorded, or monitored and may be saved, for the purpose of crowdsourcing crowd size and/or navigation data. Some embodiments of the present invention include periodic reminders of the tracking, recording, and/or monitoring of the information about the user throughout the course of any such use.

Some embodiments of the present invention include regular (e.g. daily, weekly, monthly) reminders to participating parties that they have consented to being tracked, recorded, and/or monitored for crowdsourcing crowd size and/or navigation data, and may provide the participating parties with the opportunity to opt-out of the recording and monitoring if desired. Furthermore, to the extent that anyone is recorded, monitored, or counted who did not consent to being recorded, monitored, or counted, such activities take place for the limited purpose of providing an accurate crowd count and/or global positioning satellite (GPS) mapped path of the crowd, with protections in place to prevent the unauthorized use or disclosure of any data for which an individual might have a certain expectation of privacy.

Implementation of embodiments of the invention may take a variety of forms, and exemplary implementation details are discussed subsequently with reference to the figures (i.e., FIG. 1-FIG. 4).

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110, and computing device 120 interconnected over short-range communications 130.

In general, short-range communications 130 can be any combination of connections and protocols that will support communications between computing device 110 and computing device 120, within distributed data processing environment 100. FIG. 1 provides only an illustration of one implementation and does not imply any limitations with regard to the environments in which different embodiments can be implemented. Many modifications to the depicted environment can be made by those skilled in the art without departing from the scope of the invention as recited by the claims.

In various embodiments, computing device 110 and computing device 120 can each be, but are not limited to, a standalone device, a client, a server, a laptop computer, a tablet computer, a netbook computer, a personal computer (PC), a smart phone, a desktop computer, a smart television, a smart watch, a radio, a mobile device, a stereo system, and/or any programmable electronic internet of things (JOT) device capable of communicating with various components and devices within distributed data processing environment 100, via short-range communications 130 or any combination therein. In general, computing device 110 and computing device 120 can each be representative of any programmable IOT device or a combination of programmable IOT devices capable of executing machine-readable program instructions and communication with users of other IOT devices via short-range communications 130 and/or capable of executing machine-readable program instructions and communicating with a server computer. In various embodiments, distributed data processing environment 100 can comprise a plurality of computing devices.

In other embodiments, computing device 110 and computing device 120 can each represent any programmable electronic IOT device, computing device, or combination of programmable electronic IOT devices or computing devices capable of executing machine readable program instructions, manipulating executable machine-readable instructions, and communicating with a server computer (not shown), and other IOT devices (not shown) within distributed data processing environment 100 via a network, such as short-range communications 130. In the depicted embodiment, computing device 110 includes an instance of user interface (interface) 106, local storage 104 and crowd counting component (counter) 112. In the depicted embodiment, computing device 120 includes instances of interface 126, local storage 124, and crowd counting component (counter) 122. In other embodiments, not depicted in FIG. 1, distributed data processing environment 100 can comprise two or more computing devices, one or more server computers, and/or one or more short-range communications means. Computing device 110 and computing device 120 can each include internal and external hardware components, as depicted, and described in further detail with respect to FIG. 6.

User interface (interface) 106 provides an interface to counter 112 on computing device 110. Interface 106 can enable a user or a client to interact with counter 112 and/or computing device 110 in various ways, such as sending program instructions, receiving program instructions, sending and/or receiving messages, updating data, sending data, inputting data, editing data, collecting data, and/or receiving data. In one embodiment, Interface 106 can be a graphical user interface (GUI) or a Hypertext Markup Language (HTML) based user interface and can display text, documents, HTML pages, user options, application interfaces, and instructions for operation. Interface 106 can include information (such as graphic, text, and sound) a program presents to a user and control sequences the user employs to control the program. In various embodiments, interface 106 can be a mobile application software providing an interface between a user of computing device 110 and one or more other computing devices (e.g., computing device 120). In another embodiment, interface 106 can be a mobile application software providing an interface between a user of computing device 110 and one or more other computing devices. Mobile application software, or an "app," can be a computer program designed to run on smart phones, tablet computers and other IOT devices. In an embodiment, interface 106 can enable the user of IOT device 110 to send data, input data, edit data (annotations), collect data and receive data.

User Interface (interface) 126 provides an interface to counter 122 on computing device 120. Interface 126 can enable a user or a client to interact with counter 122 and/or computing device 120 in various ways, such as sending program instructions, receiving program instructions, sending and/or receiving messages, updating data, sending data, inputting data, editing data, collecting data, and/or receiving data. In one embodiment, interface 126 can be a GUI or an HTML based user interface and can display text, documents, HTML pages, user options, application interfaces, and instructions for operation. Interface 126 can include information (such as graphic, text, and sound) a program presents to a user and control sequences the user employs to control the program. In various embodiments, interface 126 can be a mobile application software providing an interface between a user of computing device 120 and one or more other computing devices (e.g., computing device 110). Mobile application software, or an "app," can be a computer program designed to run on smart phones, tablet computers and other IOT devices. In an embodiment, interface 106 can enable the user of IOT device 110 to send data, input data, edit data (annotations), collect data and receive data.

In the depicted embodiment, counter 112 executes on computing device 110 and counter 122 executes on computing device 120. In other embodiments, not depicted in FIG. 1, counter 112 can counter 122 can each execute on one or more computing devices and/or be standalone devices. In some embodiments, counter 112 and counter 122 can each execute anywhere within distributed data processing environment 100, as long as counter 112 and/or counter 122 can communicate with one or more computing devices.

In various embodiments, counter 122 and/or counter 112 can receive and/or assign a unique crowd identifier to one or more crowds. In various embodiments, one or more participants or groups of participants forming one or more crowds is identified by one or more Gid. In various embodiments, counter 122 and/or counter 112 can assign a Gid to one or more participants or groups of participants forming one or more crowds. In various embodiments, one or more participants can receive or be assigned an OGid, via computing device 110 or computing device 120 from counter 122 or counter 112, in which the one or more OGid corresponds to a default group, with a single member, that the participant first belonged to.

In various embodiments, counter 122 and/or counter 112 can transmit one or more information vectors, on a periodic basis, and receive one or more information vectors from one or more other participants. For example, counter 112 instructs and enables computing device 110 to transmit and receive information vectors to and from computing devices within a predetermined range of computing device 110 (i.e., computing devices within range for short-range communication). In various embodiments, counter 122 and/or counter 112 can wait for an event to occur (i.e., wait to receive one or more information vectors). In various embodiments, counter 122 and/or counter 112 can time-out waiting for an event to occur based on a predetermined amount of time.

In various embodiments, one or more participants can move between groups, according to the programmatic logic described below. It should be noted that an information vector is defined as follows:

IV=Cid & OGid &Gid & SM, where, IV is the information vector, Cid is the crowd identifier, OGid is the own group identifier, Gid is the group identifier, and SM is the Smart Map.

The smart map records how the computing device of a participant sees the members of the group the participant belongs to. It should be noted that "SM=RM & AM," in which RM represents a recent map aimed at recording the most recent group members in short-range communication with the computing devices of participants and AM represents aggregated map that counts how many members are in the group and not recorded in the recent map. It should also be noted that "RM={_m:t}," in which m is a participant's own group identifier and t is a time stamp representing the age of group membership for the participant having the own group identifier "m." No assumption is made on the unit used for measuring the time stamp (t). In various embodiments, the size of the recent map remains below a predetermined threshold known as the max map size.

In should be noted that recent size is the number of group members recorded in the recent map. Because an aggregated map is a map that counts how many members are in the group and not recorded in the recent map as follows:

AM=#AS:tOLD, where AM is the aggregated map, AS represents the aggregated size (the number of group members of the aggregated map) and tOLD is a time stamp representing the minimal age of the members of aggregated map.

In one embodiment, if AS=0, then tOLD is set to an infinite value. It should be noted that in some embodiments, tMID can equal tOLD where tMID is the maximal t found in the recent map. It should also be noted that S represents the smart map (or group) size, wherein "S=RS+AS," where RS is the recent size (the number of group members of the recent map). This programmatic logic can be used to calculate the smart map size or group size.

For example, where the maximum map size is five and there are five identified members with the own group identifiers: 101, 102, 103, 104 and 105 the smart map is represented as follows:

SM=101:11_102:12_103:13_104:14_105:15#22:20.

In this particular example, the recent map is represented as follows:

RM=_101:11_102:12_103:13_104:14_105:15;

RS=5. and

AM=#22:20.

Accordingly, there are 22 members; tMID=15; tOLD=20; AS=22; and S=27 (RS+AS=5+22).

In various embodiments, two main cases can be distinguished, based on whether the transmitters and the receivers belong to the same group or to different groups. In various embodiments, the transmitter participant is identified by index=1, transmitting an information vector "IV1" where "IV1=Cid1 & OGid1 &Gid1 & SM1") as discussed above along with an identifying index number. The receiver participant is identified by index=2 having the identifying parameters "Cid2&OGid2&Gid2&SM2") where the suffix is the index of the device for which the parameters apply. For clarity in describing embodiments of the present invention, hereinafter, computing device 110 will be the transmitter participant (i.e., transmitter) and computing device 120 will be the receiver participant (i.e., receiver). In other embodiments, computing device 110 can be the receiver participant and computing device 120 can be the transmitting participant. In various embodiments, counter 122 enables the receiver (e.g., computing device 120) to update the group identifier and the smart map.

In various embodiments, counter 112 can assume that crowd identifiers for the transmitting participant and the receiving participant are the same. In embodiments where the transmitters and the receivers belong to the same group (e.g., Gid1=Gid2), counter 112 and/or counter 122 can merge and/or integrate the smart maps of the receivers and the transmitters. In one particular embodiment, with reference to FIG. 2, where the newest member of the aggregate map is the same as the maximal age of any member in the two merging maps, the merging of two smart maps is performed by the following process (i) reshaping the two smart maps along the common pair of parameters tMID and tOLD, where tOLD is defined as follows:

tOLD=Min(tOLD1,tOLD2), where tMID represents the greatest time, t, for any member in both the first recent map associated with the transmitter (RM1) and the second recent map associated with the receiver (RM2) less than or equal to tOLD; (ii) merging the two recent maps (e.g., RM1 and RM2) together and the two corresponding aggregated maps together; and (iii) splitting the resulting smart map so that the max map size limit can be respected, in which the recent map remains below the max map size, wherein if after reshaping and merging the recent map size is above the max map size, then counter 122 splits the maps again so that the max map size limit is not overpassed.

Figure 3:
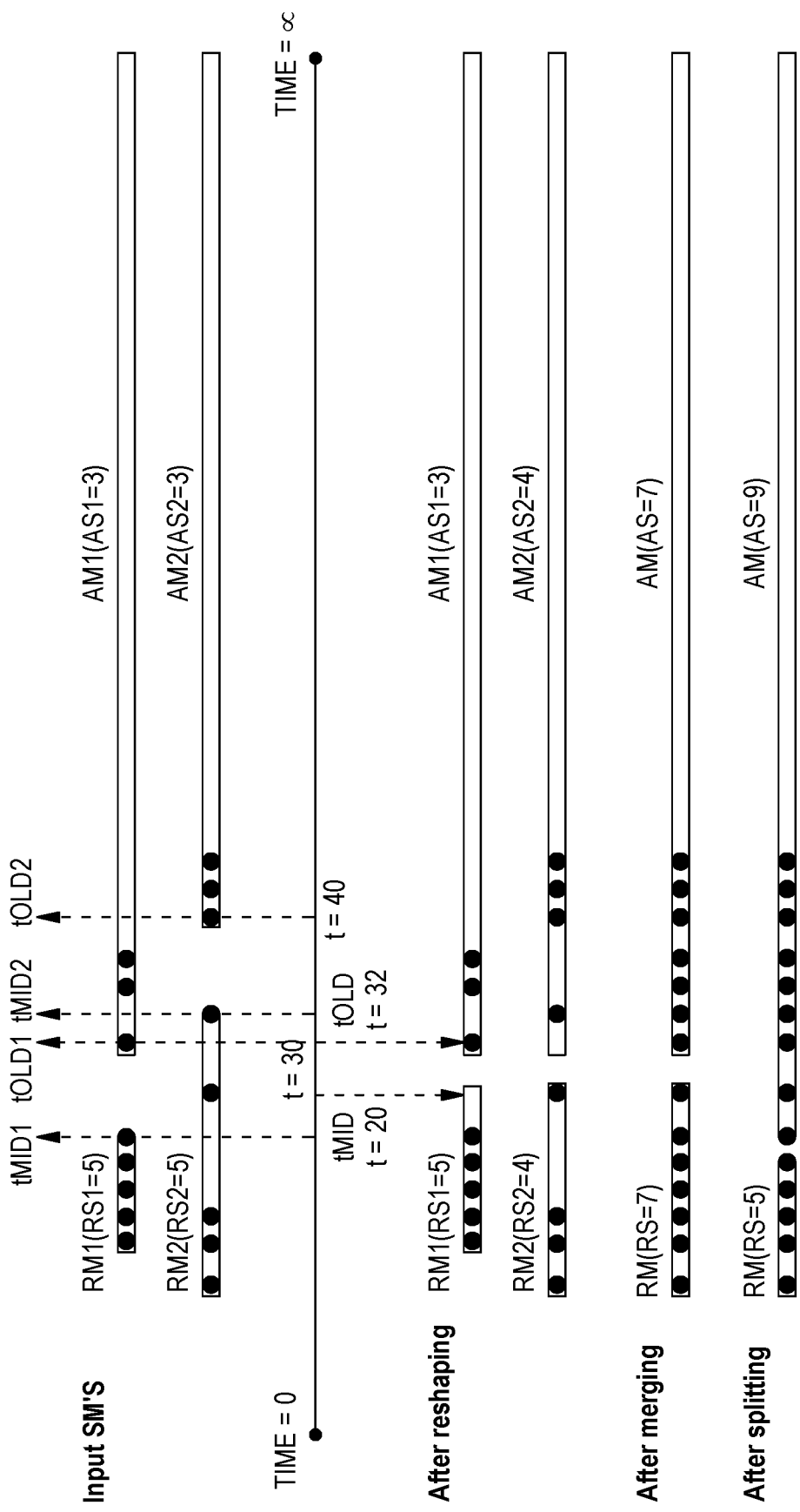
FIG. 3 is an example of the crowd counting component within the distributed data processing environment of FIG. 1, in accordance with one example of the present invention.

This process shown on FIG. 3 illustrates a recent map reaching 7 members, RS=7, before being "re-split" to keep the recent map at the maximum map size of 5, RS=5 members. In various embodiments, when counter 112 and/or counter 122 are merging RM1 and RM2, merging can be done if the same member(s) is found in both recent maps then the resulting map size is lower than RS1+RS2.

Figure 2:
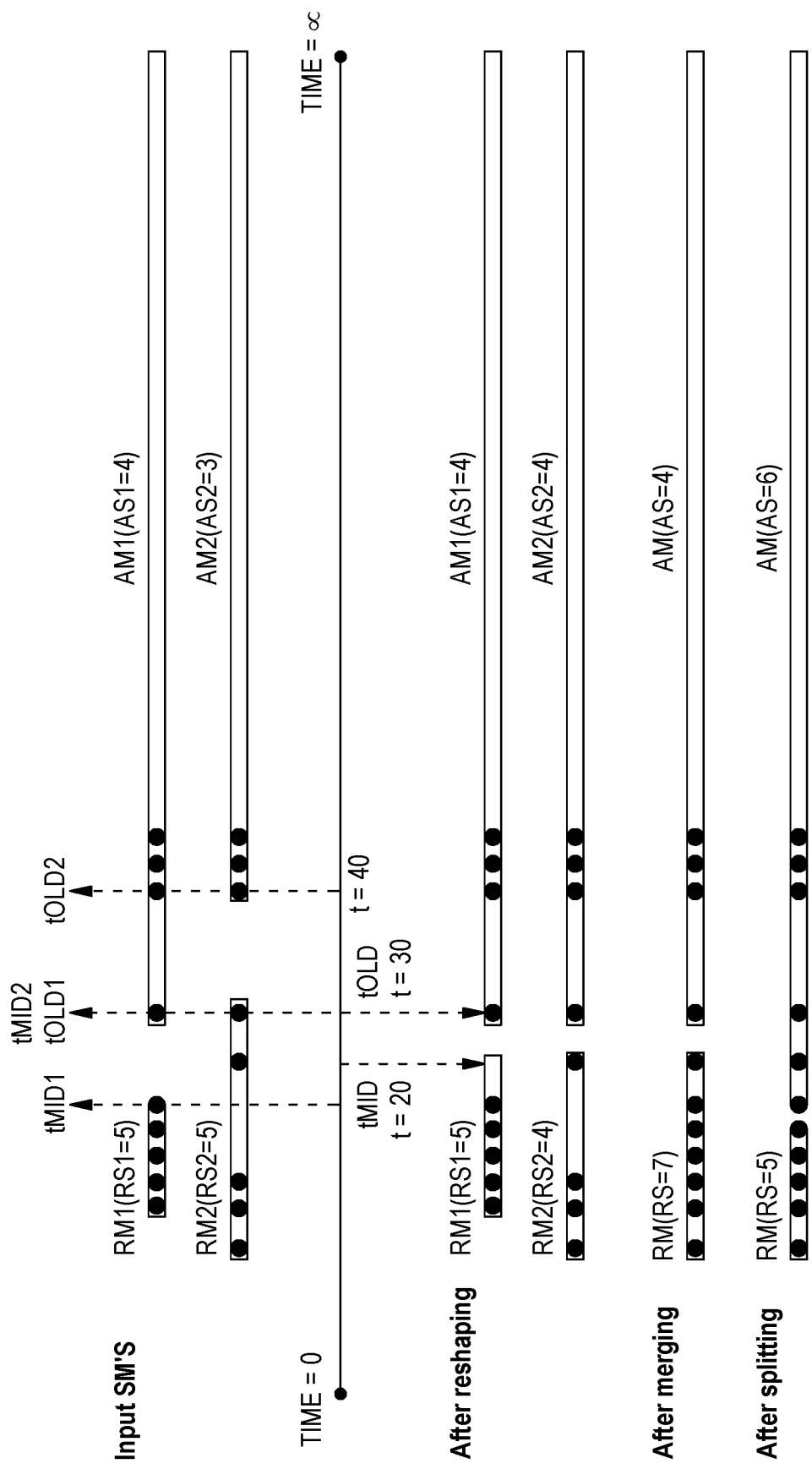
FIG. 2 is an example of crowd counting component within the distributed data processing environment of FIG. 1, in accordance with one example of the present invention.

In various embodiments, counter 112 and/or counter 122 can determine if the Cid's are the same between the crowd or group counter 112 and counter 122 are associated with, respectively. In various embodiments In various embodiments, for the aggregated maps, without visibility on the members, counter 112 and/or counter 122 can assume that the aggregated maps can correspond to the same set of members (i.e., ASSUMPTION #1). In various embodiments, counter 112 and/or counter 122 can split the resulting smart map so that the max map size limit can be respected. For example, as shown in FIG. 2, two identical members are found in RM1 and RM2. In this particular example, the smart map input from counter 112 is RS1=5, tMID1=20, tOLD1=30, and AS1=4; and the smart map input from counter 122 is RS2=5, tMID2=30, tOLD2=40, and AS2=3, as shown in FIG. 2. As a result, in this particular example, after the first reshaping where old members of the group RM2 are moved to aggregate map 2 and the first merging of the two recent maps, RM1 and RM2, the new recent size is 7 as illustrated by:

RS=RS1+RS2−2(common members)=5+4−2=7.

It should be noted that the time stamps can be any predetermined unit of time.

In various embodiments, when a transmitter and a receiver are within short-range communication of each other and belong to different groups (i.e., Gid1=1=Gid2), the receiver can either join the group of the transmitter or the receiver can absorb the transmitter's group. For example, if computing device 110 (transmitter) and computing device 120 (receiver) belong to different groups then computing device 120 will either join the group computing device 110 belongs to or absorb the group computing device 110 belongs to. In various embodiments, when a receiver's group joins a transmitter's group the group member data collected by the receiver is shared and/or integrated with the group member data collected by the transmitter, wherein group member data are local variables. In various embodiments, when a transmitter's group absorbs a receiver's group, the group member data collected by the receiver's group is integrated with the group member data collected by the transmitter's group.

In various embodiments, the corresponding programmatic logic is as follows: "If (S2>S1) or (S2=S1 and Gid2>Gid1) then Gid=Gid2 else Gid=Gid1 end if" wherein S1 and S2 refer to smart map size or group map size defined by adding the recent size with the aggregate size. In various embodiments, counter 122 can merge the smart maps of receivers with the smart maps of transmitters according to future (changed or unchanged) groups of the receiver. In some embodiments, counter 112 can merge the group count of transmitters with the group count of receivers. In some embodiments, one or more cases can be found, depending on the relative age of memberships of the recent maps and the aggregate maps.

In various embodiments, counter 122 merges two smart maps by reshaping the two smart maps along a common pair of parameters, tMID and tOLD, as shown in FIG. 3 where the parameters are defined as follows:

tOLD=Min(tOLD1,tOLD2); and tMID=longest lasting member of either recent map, RM1 and RM2 but newer than or the same membership age as tOLD, where tOLD refers to the minimal age of the members of aggregated maps 1 and 2.

Additionally, in various embodiments, counter 122 can merge recent maps with aggregate maps. Merging the smart maps of receivers and transmitters when the transmitters and receivers belong to different groups is illustrated in FIG. 3. For example, illustrated in FIG. 3, counter 122 merges RM1 and RM2 when the same member is found in both recent maps. In this example, when merging RM1 and RM2 when the same member can be found in both recent maps the resulting RS can be found lower than RS1+RS2. In this particular example, the smart map input from counter 112 is RS1=5, tMID1=20, tOLD1=30, and AS1=3; and the smart map input from counter 122 is RS2=5, tMID2=32, tOLD2=40, and AS2=3. For the aggregated maps, (without visibility on the members), the assumption is that all the members differ (ASSUMPTION #2). Accordingly, in this example, the aggregated size, AS, is determined as follows:

AS=AS1+AS2.

Finally, in this example illustrated in FIG. 3, counter 122 splits the resulting smart map, RM, so that the max map size limit is respected. In this example, when two common members are found in RM1 and RM2:

RS=RS1+RS2−2(common members)=5+4−2=7.

Simulation examples of counter 112 and counter 122 have been conducted under different sets of parameters to assess the sensitivity of the proposed schema on the parameter "max map size." In various embodiments, max map size can be a parameter driving, on one side, the storage and communication capabilities required for the computing device 110 and/or computing device 120, and, on the other side, the risk to miss-compute the size of the crowd, should the assumptions ASSUMPTION#1 and/or ASSUMPTION#2 be found to be false in some specific cases. In various embodiments, the size of the max map size is specified by the parameter MMS % (max map size percent) defined as the ratio between max map size and the real crowd size (e.g., MMS %=MMS/CS), where MMS is max map size and CS is real crowd size. The real crowd size (CS) refers to the count of actual participants, not other people, such as bystanders. In one example, if MMS %=100% then the smart map corresponds to the recent map and the aggregated map remains empty (i.e. aggregate size is zero). In this particular embodiment, the assumptions (i.e., ASSUMPTION#1 and ASSUMPTION#2) cannot be false because the assumptions are not exercised, and the simulations described below can determine that the correct result for participant count, S is as follows:

S=RS=CS.

In the simulated examples illustrated in Table 1 and Table 2, max map size percent was assigned a reference value of 95% (i.e., MMS %=95%) and the simulations evaluated how the resulting error degrades when max map size percent represents lower values.

Table 1 illustrates the simulation results of an ascending value of the max map size percent and the associated error degradation percent. The results in Table 1 illustrate that counter 122 is robust when max map size percent increases: ASUMPTION#1 and ASSUMPTION#2 are in most of the cases true. With MMS %=75%, the resulting error is less than 4% worse than with the case MMS %=95%. In this one example, represented by Table 1, counter 122 performs as described above because the reference case MMS %=95% introduces a negligible error of 0.00% versus −0.67% in the perfect case were MMS %=100%, in which all the unique crowd identifiers were recorded.

TABLE 1

Illustrates simulation results of an ascending MMS %
value and the associated error degradation percent

| MMS % | Error Degradation % |
|---|---|
| 75% | 3.67% |
| 85% | 1.33% |
| 95% | 0.00% |
| 100% | −0.67% |

Table 2 illustrates the simulation results of a further ascending MMS % value and the associated error degradation percent (%). The results of Table 2 describe MMS %=75% comprising error degrading by less than 2% versus the error degradation produced when MMS %=95%. Additionally, the results described in Table 2 illustrate that counter 122 remains stable when MMS % decreases (i.e., when MMS %=45%), error degradation is less than 9%).

TABLE 2

Illustrates the simulation results of an ascending MMS
% value and the associated error degradation percent

| MMS % | Error Degradation % |
|---|---|
| 45% | 8.89% |
| 55% | 7.12% |
| 75% | 1.95% |
| 95% | 0% |

In various embodiments, for a large crowd, crowd identifiers can be introduced (e.g. Cid1 to CidN), wherein the participants can randomly select which of the crowd identifiers they belong to within the large crowd. In one particular embodiment, the random selecting of crowd identifiers can correspond to artificially splitting the crowd into N sub-crowds. One in the art can appreciate that N can represent positive integers. In this particular embodiment, the sub-crowds are reduced in size (around N times smaller) and are thus less sensitive to the max map size.

In various embodiments, the evaluation of the total numbers of participants is determined by the sum of the sizes of the sub-crowds within the crowd, each sub-crowd having identified memberships such that duplicate counts can be avoided. In various embodiments, if participants are not equipped with computing devices a counter extends the proposed programmatic logic by replacing the recent map element {m:t} with a weighted version of the recent map {m;w:t}, wherein the parameter "w" represents the weight specifying how many participants are included by this element. For example, if a group of four participates are in a crowd but only one computing device is shared by the group, a counter weights a single person in the group as weighting four times, to indicate four participants are counted for the one shared computing device. The extension of the proposed programmatic logic, in particular regarding the computation of the smart map sizes, causes the sum of the weights of all elements to be considered instead of the number of elements in both the recent map and the smart map.

Figure 4:
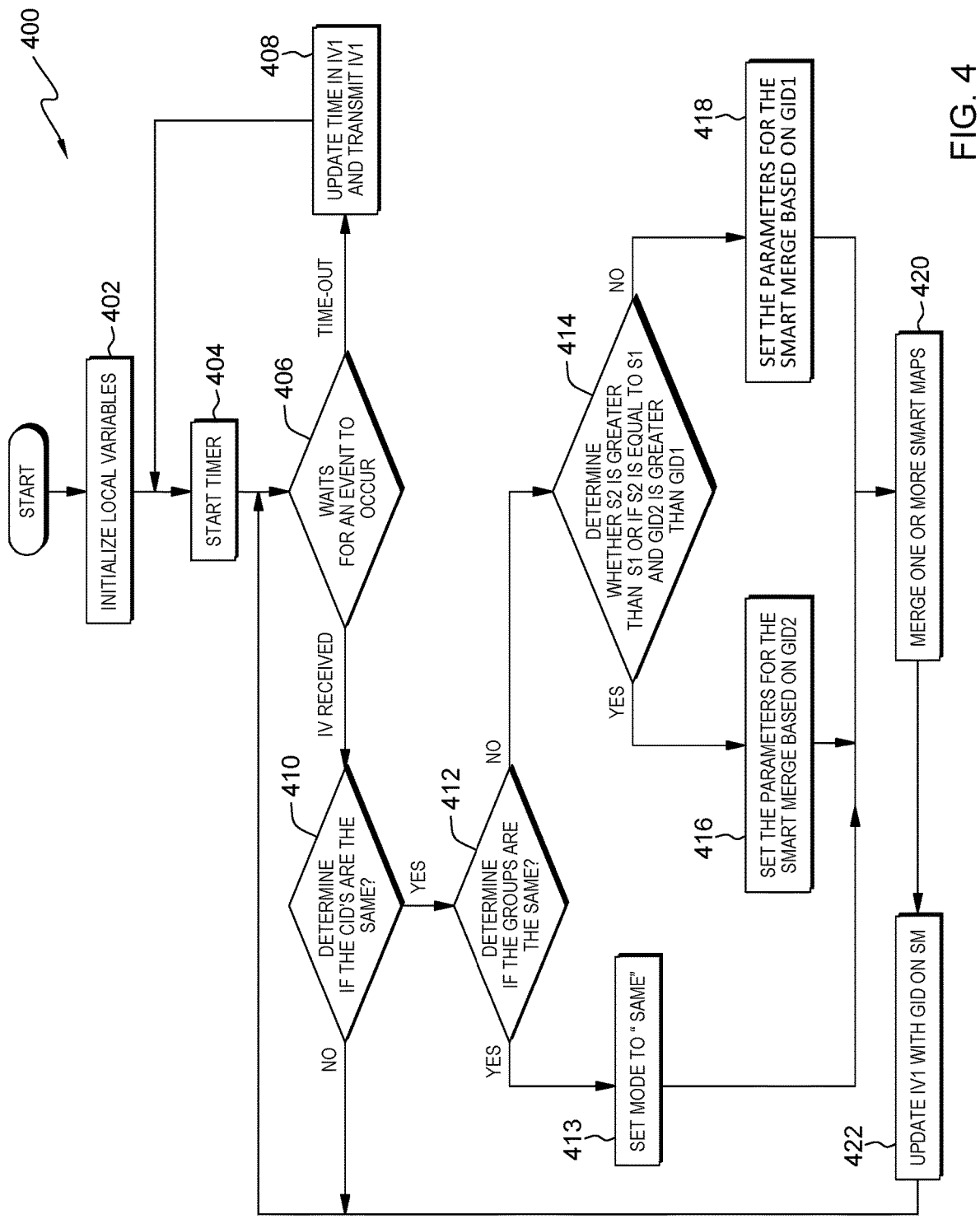
FIG. 4 illustrates operational steps of the crowd counting component, in communication with a computing device within the distributed data processing environment of FIG. 1, for counting participants in a crowd, in accordance with an embodiment of the present invention.

FIG. 4 illustrates operational steps for crowd counters according to some embodiments of the present invention, such as counter 112 and/or counter 122 of FIG. 1. The process, generally designated 400, counts participants in a crowd. FIG. 4 provides an illustration of one implementation and does not imply any limitations with regard to the environments in which different embodiments can be implemented. Many modifications to the depicted environment can be made by those skilled in the art without departing from the scope of the invention as recited by the claims.

In step 402, a crowd counter, such as counter 112, initializes local variables. In various embodiments, the crown counter can initialize one or more local variables including: OGid1=my unique Id; Cid1=Crowd Id; Gid1=OGid1; SM1=_OGid1:0#0: ∝; and/or IV1=Cid1&OGid1& Gid1&SM1.

In step 404, counter 112 starts a timer. In various embodiments, counter 112 can start a timer, wherein the associated duration is represented by adding a random delay (i.e. "random") to a fixed time interval (i.e., TimeToXmit or "TTX" for short): StartTimer (TTX+random).

In step 406, counter 112 waits for an event to occur. In various embodiments, counter 112 can wait for an event to occur, wherein an event is either the reception of an information vector issued by one or more computing devices through short-range communication within the predetermined amount of time, or a time-out event of the running timer. In various embodiments, counter 112 is in a wait state, monitoring for two possible events: (i) reception of an information vector or (ii) reception of a time-out that will trigger the transmission of an information vector. In the depicted embodiment, if counter 112 determines that an information vector has been received from a computing device through short-range communication ("IV received" branch) then the process advances to step 410. In various embodiments, counter 112 can determine the reception of an information vector from the computing device through short-range communication based on the following programmatic logic (IV2=Cid2&OGid2&Gid2&SM2 Received). In the depicted embodiment, if the timer (previously started at step 404) reaches its duration limit, resulting into a Time-Out event, then the process can advance to step 408 ("Time-Out" branch).

In step 408, counter 122 updates the time associated with its corresponding information vector, IV1, and transmits the information vector. In various embodiments, counter 122 can update the time associated with its corresponding information vector. In various embodiments, counter 122 can update the time other information vectors and transmit and/or retransmit its information vector, IV1.

In step 410, counter 122 determines if the parameter Cid2, crowd identifier for member 2 is the same as the crowd identifier associated with counter 122 (i.e., Cid2=Cid1). In the depicted embodiment, counter 122 can determine that Cid2 is the same or equal to Cid1 (Yes branch) and processing will proceed to step 412. In the depicted embodiment, counter 122 can determine that Cid2 is the not the same as Cid1 and processing returns to step 406.

In step 412, counter 122 determines if the parameter, Gid1, group identifier associated with the counter, and Gid2, group identifier for member 2, correspond to the same group. In various embodiments, counter 122 can determine if Gid1 and Gid2 correspond to the same group, wherein counter 122 determines if Gid1 and Gid2 are the same (i.e., Gid1=Gid2). In the depicted embodiment, if counter 122 determines that Gid1 and Gid2 are the same (Yes step) then processing proceeds to step 413. In the depicted embodiment, if counter 122 determines that Gid1 and Gid2 are not the same (No step) then processing proceeds to step 414.

In step 413, counter 122 sets the mode for member 2 to "Same." In various embodiments, counter 122 determines that the receiving and transmitting devices belong to the same group based on the Gid, Cid, and/or OGid of the computing devices that receive and transmit information vectors. Accordingly, the counter sets the variable mode of the transmitting device to the value "Same" (Mode=Same).

In step 414, counter 122 determines whether S2 is greater than S1 or if S2 is equal to S1 and Gid2 is greater than Gid1. In various embodiments, counter 122 can determine whether S2 is greater than S1 or if S2 is equal to S1 and Gid2 is greater than Gid1 based on the programmatic logic that: If (S2>S1) or (S2=S1 and Gid2>Gid1); then Gid=Gid2; else Gid=Gid1; end if. In the depicted embodiment, if counter 122 determines S2 is greater than S1 or if S2 is equal to S1 and Gid2 is greater than Gid1 (Yes branch) then counter 122 can advance to step 416. In the depicted embodiment, if counter 122 determines S2 is not greater than S1 or if S2 is not equal to S1 and Gid2 is not greater than Gid1 (No branch) then counter 122 can advance to step 418.

In step 416, counter 122 sets the parameters for the smart merge based on the values of the largest group, Gid2. In various embodiments, counter 122 can set the parameters for the smart merge and establish the smart merge based on Gid2, wherein the parameters are when S2>S1 or S2=S1 and Gid2>Gid1; then Gid=Gid2; else Gid=Gid1; end if, in which Mode=Join, Gid=Gid2.

In step 418, counter 122 sets the parameters for the smart merge based on the values of the smallest group, Gid1. In various embodiments, counter 122 can set the parameters for the smart merge based on Gid1 and establish the smart merge based on Gid1 wherein the parameters are if S2>S1 or S2=S1 and Gid2>Gid1; then Gid=Gid2; else Gid=Gid1; end if, in which Mode=Join, Gid=Gid1.

In step 420, counter 122 merges the two smart maps. In various embodiments, counter 122 can create a smart map by merging recent maps with their corresponding aggregated maps.

In step 422, counter 122 updates its corresponding information vector with a Gid on the merged smart map. In various embodiments, counter 122 can update its information vector with the Gid's on the merged smart map. In various embodiments, counter 122 can output a smart map to display to a user an accurate count of participants in the crowd.

Figure 5:
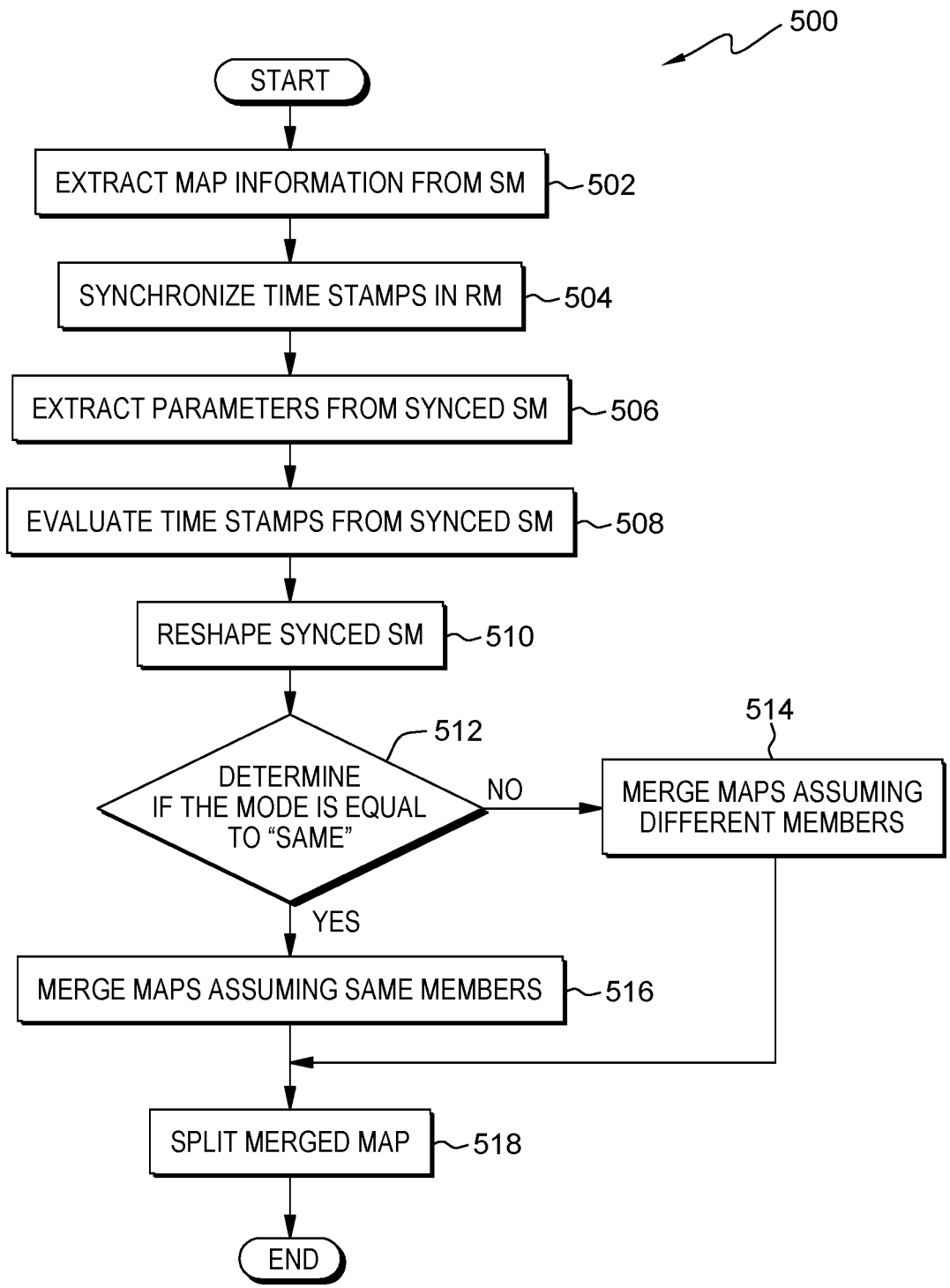
FIG. 5 illustrates operational steps of the crowd counting component, in communication with a computing device within the distributed data processing environment of FIG. 1, for counting the number of participants in a crowd, in accordance with an embodiment of the present invention.

FIG. 5 illustrates operational steps for crowd counters according to some embodiments of the present invention, such as counter 122 of FIG. 1. The process, generally designated 500, counts the number of participants in a crowd. FIG. 5 provides an illustration of one implementation and does not imply any limitations with regard to the environments in which different embodiments can be implemented. Many modifications to the depicted environment can be made by those skilled in the art without departing from the scope of the invention as recited by the claims.

In step 502, counter 122 extracts map information from a smart map. In various embodiments, counter 122 can extract map information, wherein map information is drawn from the recent map and the aggregated map data from a smart map. Where the recent map and the aggregated map data and the smart map can be illustrated with wildcards as placeholders representing various participants of a group or crowd, each participant being numbered (i.e., the counter may extract RM* and AM* from SM*).

In step 504, counter 122 synchronizes time stamps in the recent maps of the merging smart maps. In various embodiments, counter 122 can synchronize time stamps in recent maps for common members among recent maps and to generate a synced smart map set.

In step 506, counter 122 extracts parameters from the synced smart map set. In various embodiments, counter 122 can extract one or more parameters from the synced smart map set.

In step 508, counter 122 evaluates tOLD and tMIN extracted from the synced smart map set. In various embodiments, counter 122 can evaluate tOLD and tMIN from the synced smart map set.

In step 510, counter 122 reshapes the synced smart map set. In various embodiments, counter 122 can reshape the synced smart map set with tOLD and tMIN.

In step 512, counter 122 determines if the mode value for each recent map is equal to "Same". In various embodiments, counter 122 can determine if the mode value for each recent map is equal to "Same". In the depicted embodiment, if counter 122 determines that the mode value for each recent map is equal to "Same" then processing proceeds to step 516 (Yes branch). In the depicted embodiment, if counter 122 determines that the mode value for each recent map is not equal to "Same" then processing proceeds to step 514 (No branch).

In step 514, counter 122 merges smart maps assuming participants represented by the smart maps belong to different groups. In various embodiments, counter 122 can merge one or more synced smart maps assuming the one or more synced maps comprise participants of different groups or different crowds, if combining crowds.

In step 516, counter 122 merges smart maps assuming the participants represented by the smart maps belong to the same group. In various embodiments, counter 122 can merge one or more synced smart maps assuming the one or more synced maps comprise participants of the same group or crowd.

In step 518, counter 122 splits merged smart maps. In various embodiments, counter 122 can split the merged smart maps. In various embodiments, counter 122 can output an updated recent map and aggregated map of a merged smart map, wherein older members of the representative crowd are moved from the recent maps to the aggregated maps based on a predetermined tOLD and tMIN.

Figure 6:
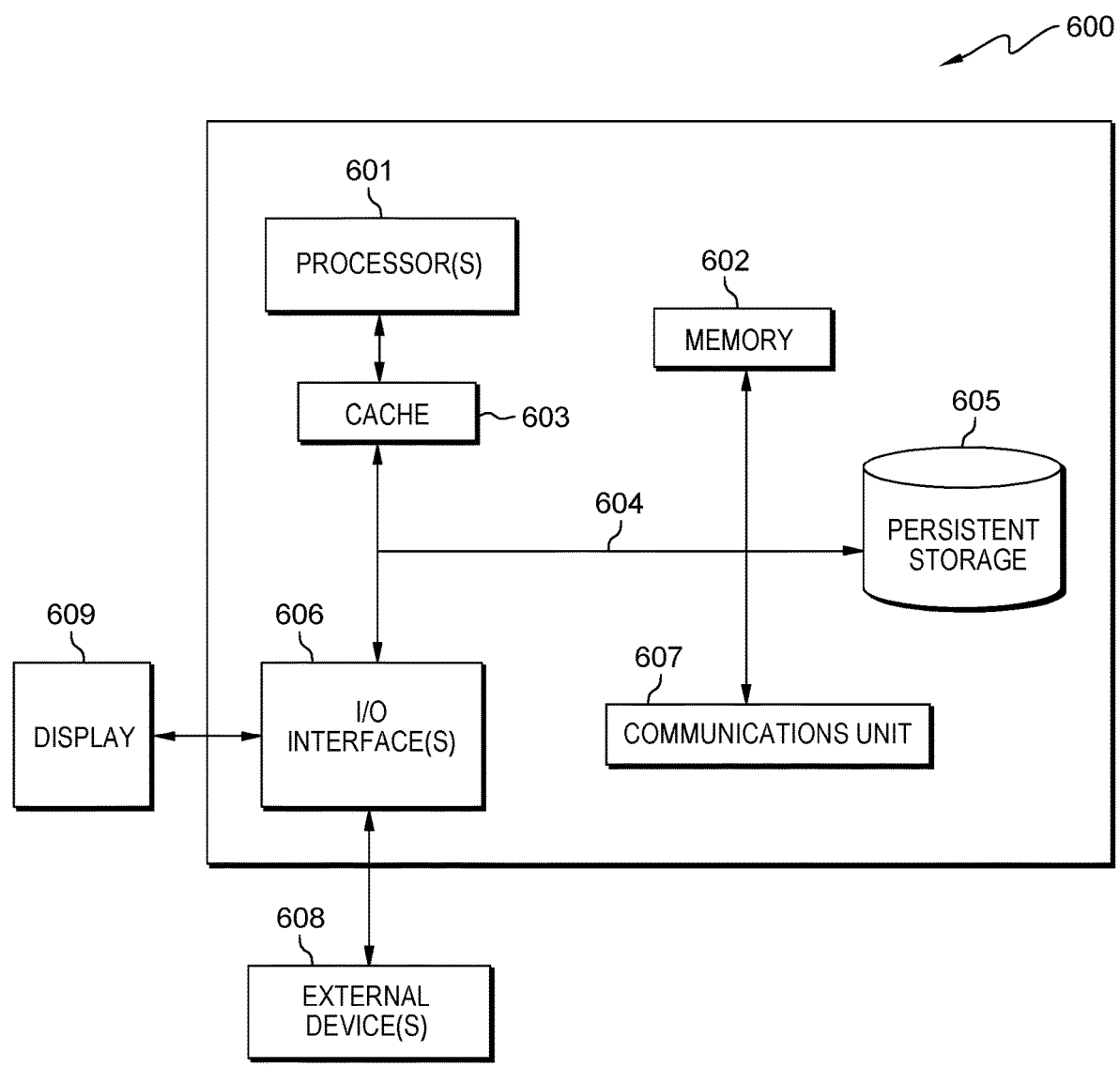
FIG. 6 depicts a block diagram of components of the computing device executing the crowd counting component within the distributed data processing environment of FIG. 1, in accordance with an embodiment of the present invention.

FIG. 6 depicts a block diagram of components of computing device 110 and computing device 120, generally designated 600, within distributed data processing environment 100 of FIG. 1, in accordance with an embodiment of the present invention. It should be appreciated that FIG. 6 provides only an illustration of one implementation and does not imply any limitations with regard to the environments in which different embodiments can be implemented. Many modifications to the depicted environment can be made.

FIG. 6 depicts computer system 600, where computing device 110 and/or computing device 120 represents an example of computer system 600 that includes counter 112 and/or counter 122. The computer system includes processors 601, cache 603, memory 602, persistent storage 605, communications unit 607, input/output (I/O) interface(s) 606, display 609, external device(s) 608 and communications fabric 604. Communications fabric 604 provides communications between cache 603, memory 602, persistent storage 605, communications unit 607, and input/output (I/O) interface(s) 606. Communications fabric 604 can be implemented with any architecture designed for passing data and/or control information between processors (such as microprocessors, communications, and network processors, etc.), system memory, peripheral devices, and any other hardware components within a system. For example, communications fabric 604 can be implemented with one or more buses or a crossbar switch.

Memory 602 and persistent storage 605 are computer readable storage media. In this embodiment, memory 602 includes random access memory (RAM). In general, memory 602 can include any suitable volatile or non-volatile computer readable storage media. Cache 603 is a fast memory that enhances the performance of processors 601 by holding recently accessed data, and data near recently accessed data, from memory 602.

Program instructions and data used to practice embodiments of the present invention can be stored in persistent storage 605 and in memory 602 for execution by one or more of the respective processors 601 via cache 603. In an embodiment, persistent storage 605 includes a magnetic hard disk drive. Alternatively, or in addition to a magnetic hard disk drive, persistent storage 605 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 605 can also be removable. For example, a removable hard drive can be used for persistent storage 605. Other examples include optical and magnetic disks, thumb drives, and smart cards that are inserted into a drive for transfer onto another computer readable storage medium that is also part of persistent storage 605.

Communications unit 607, in these examples, provides for communications with other data processing systems or devices. In these examples, communications unit 607 includes one or more network interface cards, such as short-range communications means. Communications unit 607 can provide communications through the use of either or both physical and wireless communications links. Program instructions and data used to practice embodiments of the present invention can be downloaded to persistent storage 605 through communications unit 607.

I/O interface(s) 606 enables for input and output of data with other devices that can be connected to each computer system. For example, I/O interface 606 can provide a connection to external devices 608 such as a keyboard, keypad, a touch screen, and/or some other suitable input device. External devices 608 can also include portable computer readable storage media such as, for example, thumb drives, portable optical or magnetic disks, and memory cards. Software and data used to practice embodiments of the present invention can be stored on such portable computer readable storage media and can be loaded onto persistent storage 605 via I/O interface(s) 606. I/O interface(s) 606 also connect to display 609.

Display 609 provides a mechanism to display data to a driver and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It can also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations can be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method for counting participants in a crowded environment, the method comprising:

receiving, by a first device, an information vector over a short-range communication network established between the first device and a second device, the first information vector sent by the second device, the first device having a first identifier representing a first group, the first device associated with a first set of participants having a first count, the second device having a second identifier representing a second group, the second device associated with a second set of participants having a second count;

determining the first identifier does not match the second identifier;

merging one or more smart maps from the two or more computing devices together;

comparing a first set of devices represented in the first set of participants and a second set of devices represented in the second set of participants;

identifying pairs of matching devices in the first set of devices and the second set of devices;

generating a set of unique devices by discarding one device for each pair of matching devices identified; and outputting a smart map comprising a count of participants equal to a sum of participants associated with the set of unique devices.

2. The computer-implemented method of claim 1 further comprising:

responsive to determining that the first group and second group are not the same, determining that a second smart map size or second group size is greater than a first smart map size or a first group size or that the second group size is equal to the first group size and the second identifier is greater than the first identifier; and setting parameters of the merge based on the second group identifier.

3. The computer-implemented method of claim 1, wherein merging comprises:

extracting map information from smart maps associated with the first device and second device, respectively; and synchronizing time stamps in recent maps associated with the first device and second device, respectively.

4. The computer-implemented method of claim 3 further comprising:

syncing two or more smart maps;

extracting parameters from the synced two or more smart maps; and evaluating time stamps from the synced two or more smart maps.

5. The computer-implemented method of claim 4 further comprising:
reshaping, by the one or more processors, the two or more synced smart maps; and
determining, by the one or more processors, that a mode of the synced two or more synced smart maps are equal to "Same".

6. The computer-implemented method of claim 5 further comprising:
merging the synced two or more smart maps together assuming the two or more smart maps comprise same members; and
creating a merged smart map, wherein the merged smart map comprises an updated recent map and updated aggregated map (AM).

7. The computer-implemented method of claim 1 further comprising:
updating the first information vector with the second group identifier.

8. A computer program product for counting participants in a crowd without an infrastructure, the computer program product comprising:
one or more computer readable storage devices and program instructions stored on the one or more computer readable storage devices, the stored program instructions comprising:
program instructions to receive, by a first device, an information vector over a short-range communication network established between the first device and a second device, the first information vector sent by the second device, the first device having a first identifier representing a first group, the first device associated with a first set of participants having a first count, the second device having a second identifier representing a second group, the second device associated with a second set of participants having a second count;
program instructions to determine the first identifier does not match the second identifier;
program instructions to merge one or more smart maps from the two or more computing devices together;
program instructions to compare a first set of devices represented in the first set of participants and a second set of devices represented in the second set of participants;
program instructions to identify pairs of matching devices in the first set of devices and the second set of devices;
program instructions to generate a set of unique devices by discarding one device for each pair of matching devices identified; and
program instructions to output a smart map comprising a count of participants equal to a sum of participants associated with the set of unique devices.

9. The computer program product of claim 8 further comprising:
responsive to determining that the first group and second group are not the same, program instructions to determine that a second smart map size or second group size is greater than a first smart map size or a first group size or that the second group size is equal to the first group size and the second identifier is greater than the first identifier; and
program instructions to set parameters of the merge based on the second group identifier.

10. The computer program product of claim 8, wherein merging comprises:
program instructions to extract map information from smart maps associated with the first device and second device, respectively; and
program instructions to synchronize time stamps in recent maps associated with the first device and second device, respectively.

11. The computer program product of claim 10 further comprising:
program instructions to sync two or more smart maps;
program instructions to extract parameters from the synced two or more smart maps; and
program instructions to evaluate time stamps from the synced two or more smart maps.

12. The computer program product of claim 11 further comprising:
program instructions to reshape, by the one or more processors, the two or more synced smart maps; and
program instructions to determine, by the one or more processors, that a mode of the synced two or more synced smart maps are equal to "Same".

13. The computer program product of claim 12 further comprising:
program instructions to merge the synced two or more smart maps together assuming the two or more smart maps comprise same members; and
program instructions to create a merged smart map, wherein the merged smart map comprises an updated recent map and updated aggregated map (AM).

14. The computer program product of claim 8 further comprising:
program instructions to update the first information vector with the second group identifier.

15. A computer system for counting participants in a crowd without an infrastructure, the computer system comprising:
one or more computer processors;
one or more computer readable storage devices;
program instructions stored on the one or more computer readable storage devices for execution by at least one of the one or more computer processors, the stored program instructions comprising:
program instructions to receive, by a first device, an information vector over a short-range communication network established between the first device and a second device, the first information vector sent by the second device, the first device having a first identifier representing a first group, the first device associated with a first set of participants having a first count, the second device having a second identifier representing a second group, the second device associated with a second set of participants having a second count;
program instructions to determine the first identifier does not match the second identifier;
program instructions to merge one or more smart maps from the two or more computing devices together;
program instructions to compare a first set of devices represented in the first set of participants and a second set of devices represented in the second set of participants;
program instructions to identify pairs of matching devices in the first set of devices and the second set of devices;
program instructions to generate a set of unique devices by discarding one device for each pair of matching devices identified; and program instructions to output a smart map comprising a count of participants equal to a sum of participants associated with the set of unique devices.

16. The computer system of claim 15 further comprising:
responsive to determining that the first group and second group are not the same, program instructions to determine that a second smart map size or second group size is greater than a first smart map size or a first group size or that the second group size is equal to the first group size and the second identifier is greater than the first identifier; and
program instructions to set parameters of the merge based on the second group identifier.

17. The computer system of claim 15, wherein merging comprises:
program instructions to extract map information from smart maps associated with the first device and second device, respectively; and
program instructions to synchronize time stamps in recent maps associated with the first device and second device, respectively.

18. The computer system of claim 17 further comprising:
program instructions to sync two or more smart maps;
program instructions to extract parameters from the synced two or more smart maps; and
program instructions to evaluate time stamps from the synced two or more smart maps.

19. The computer system of claim 18 further comprising:
program instructions to reshape, by the one or more processors, the two or more synced smart maps;
program instructions to determine, by the one or more processors, that a mode of the synced two or more synced smart maps are equal to "Same";
program instructions to merge the synced two or more smart maps together assuming the two or more smart maps comprise same members; and
program instructions to create a merged smart map, wherein the merged smart map comprises an updated recent map and updated aggregated map (AM).

20. The computer system of claim 15 further comprising:
program instructions to update the first information vector with the second group identifier.

* * * * *